United States Patent [19]

Ozaki

[11] Patent Number: 5,818,547
[45] Date of Patent: Oct. 6, 1998

[54] TIMING DETECTION DEVICE AND METHOD

[75] Inventor: Nozomu Ozaki, Kanagawa, Japan

[73] Assignee: Sony Corporation, Tokyo, Japan

[21] Appl. No.: 667,818

[22] Filed: Jun. 20, 1996

[30] Foreign Application Priority Data

Jun. 30, 1995 [JP] Japan .................................. 7-186616

[51] Int. Cl.$^6$ ...................................................... H04N 7/12
[52] U.S. Cl. ...................... 348/845.3; 348/845; 348/423; 348/515
[58] Field of Search ..................................... 348/500, 510, 348/512, 513, 515, 423, 845, 845.3, 845.2, 465, 466, 419; 375/371, 354, 373, 376, 357; 370/510, 511, 509, 512, 513; H04N 7/12

[56] References Cited

U.S. PATENT DOCUMENTS

| 5,396,497 | 3/1995 | Veltman ................................. 348/465 |
| 5,517,250 | 5/1996 | Hoogenboom et al. ................ 348/476 |
| 5,559,999 | 9/1996 | Maturi et al. .......................... 395/550 |
| 5,596,420 | 1/1997 | Daum ..................................... 348/515 |
| 5,598,415 | 1/1997 | Nuber et al. .......................... 370/474 |
| 5,668,841 | 9/1997 | Haskell et al. ........................ 375/371 |
| 5,715,176 | 2/1998 | Mobini .................................. 348/715 |

Primary Examiner—Michael Lee
Attorney, Agent, or Firm—Frommer Lawrence & Haug LLP; William S. Frommer

[57] ABSTRACT

A timing detection device employed in a video decoder comprising a counter for counting the number of frames of coded picture data stored in a frame memory area of a RAM; a register where the count value of the counter is loaded in accordance with the timing when a PTS (presentation time stamp) is supplied from a demultiplexer to a host processor, and the loaded count value is decremented upon completion of each analysis performed per frame of the coded picture data read out from the storage area; and a frame counter for outputting a timing detection signal from a "0" detector when the count value of the register is reset to zero. In detection of the timing to process the frame data corresponding to the PTS used as reproduction output time management information for video and audio synchronism control, it becomes possible to achieve proper interchangeability and reduction of the cost.

6 Claims, 5 Drawing Sheets

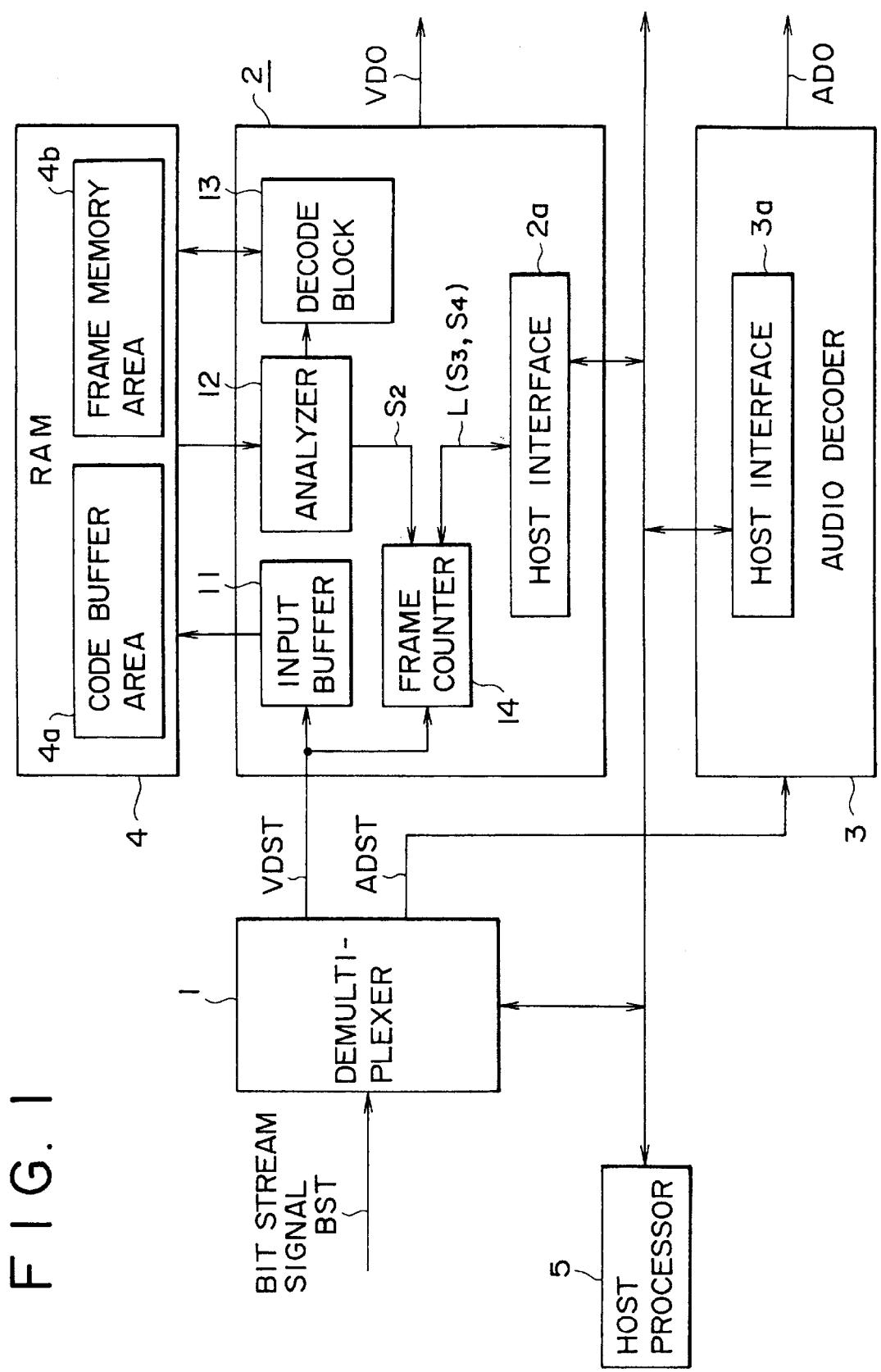
FIG. I

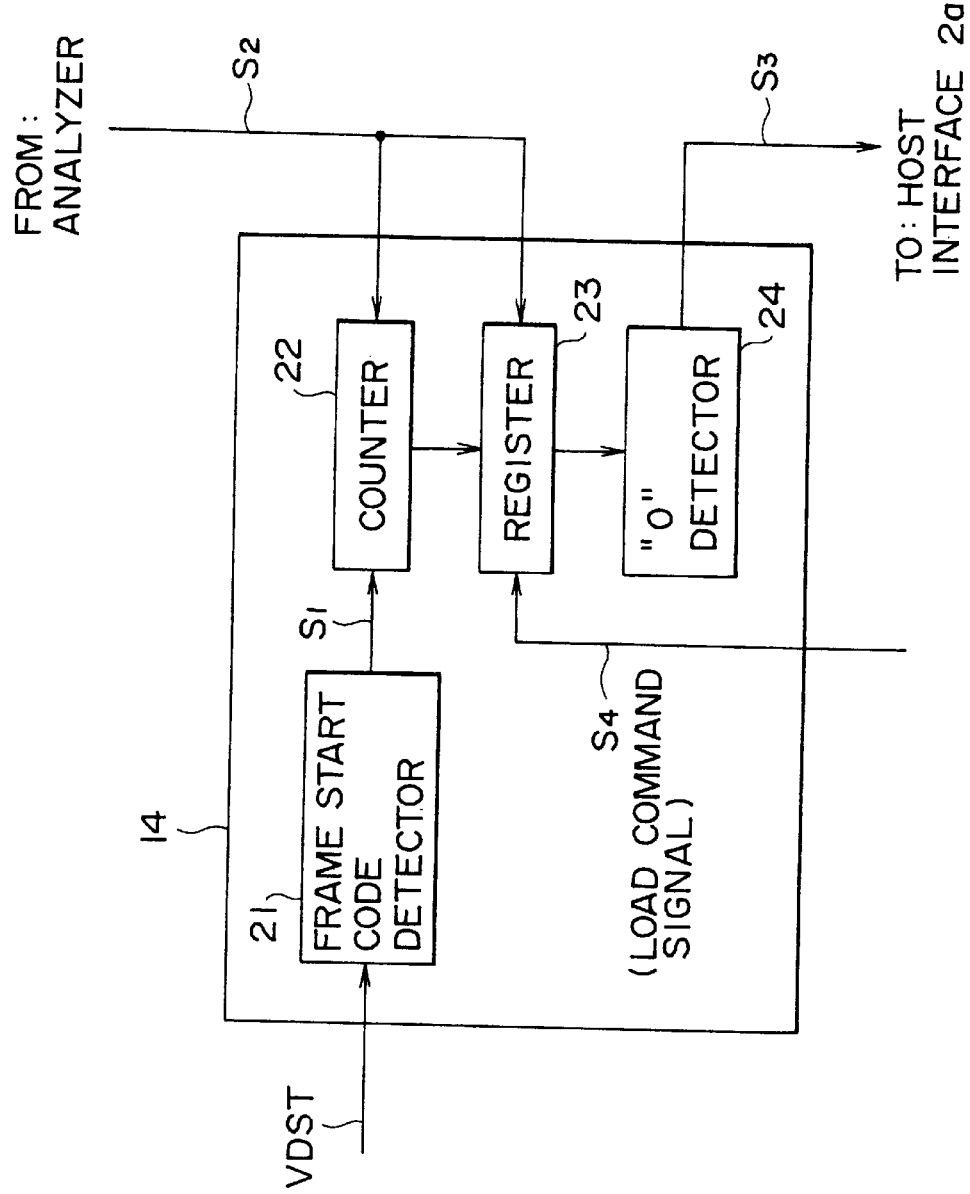

TIMING DETECTION DEVICE AND METHOD

BACKGROUND OF THE INVENTION

The present invention relates to a timing detection device and a timing detection method, and more particularly to those adapted for proper detection of a video-data decoding start timing when decoding, e.g., compressed motion picture data and audio data, so as to attain synchronism of picture and sound.

In recording media such as digital video disks (hereinafter referred to as DVD), communication media such as LAN (Local Area Network) or broadcasting media such as satellites which are used for processing video and audio signals converted into digital data, it is usual that the data are digitally compressed and coded so that the video and audio signals can be processed efficiently. One of the data compression and coding systems proposed for that purpose is the MPEG (Motion Picture Coding Experts Group) system.

In the MPEG system, data compression of a video signal is performed in any one of the following three predictive coding modes to obtain: (1) an intra-frame coded picture (I-picture) by coding the video input signal within a frame; (2) an inter-frame forward predictive coded picture (P-picture) by coding the video input signal only in a forward direction; or (3) a bidirectionally predictive coded picture (B-picture) by coding the video input signal in both forward and backward directions.

FIG. 3A shows an exemplary structure of inter-frame prediction executed by such predictive coding.

In the shown example, a data unit of GOP (Group Of Pictures) is composed of, e.g., fifteen frames. In this case, at least one frame of an I-picture is required in each GOP since random access is necessary in the GOP. Therefore, one GOP consists of one frame of an I-picture, four frames of P-pictures predicted from temporally preceding I- or P-pictures, and the remaining ten frames of B-pictures predicted bidirectionally from temporally preceding and following I- or P-pictures. A GOP is a coding unit corresponding to each segment of one sequence of motion pictures.

More specifically, as indicated by arrows in the diagram, an I-picture 1I is coded by intra-frame prediction within its frame alone; a P-picture 4P is coded by inter-frame prediction with reference to the I-picture 1I; a P-picture 7P is coded by inter-frame prediction with reference to the P-picture 4P; a P-picture 10P is coded by inter-frame prediction with reference to the P-picture 7P; and a P-picture 13P is coded by inter-frame prediction with reference to the P-picture 10P. Further, B-pictures 2B and 3B are coded by inter-frame prediction with reference to both of the I-picture 1I and the P-picture 4P; and B-pictures 5B and 6B are coded by inter-frame prediction with reference to both of the P-picture 4P and the P-picture 7P. Similarly, subsequent pictures are coded by such prediction in the manner indicated by arrows.

The numbers affixed to I, P and B denote those corresponding to the order of frames of original pictures.

In decoding the predictive-coded pictures mentioned, the I-picture can be decoded alone since it is predictive-coded within the frame thereof. However, as any P-picture is predictive-coded with reference to the temporally preceding I-picture or P-picture, such preceding I-picture or P-picture is required at the decoding time. Similarly, in decoding any B-picture coded with reference to the temporally preceding and succeeding I-pictures or P-pictures, such preceding and succeeding I-pictures or P-pictures are required.

For this reason, the pictures are positionally changed as illustrated in FIG. 3B so that the pictures required at the decoding time can be decoded in advance.

As illustrated in FIG. 3B, such positional changes are so made that the I-picture 1I precedes the B-pictures −1B and 0B since the B-pictures −1B and 0B require the I-picture 1I at the decoding time, and also that the P-picture 4P precedes the B-pictures 2B and 3B since the B-pictures 2B and 3B require the I-picture 1I and the P-picture 4P. Similarly, the pictures are positionally so changed that the P-picture 7P precedes the B-pictures 5B and 6B since the B-pictures 5B and 6B requires the P-pictures 4P and 7P at the decoding time, and also that the P-picture 10P precedes the B-pictures 8B and 9B since the B-pictures 8B and 9B require the P-pictures 7P and 10P at the decoding time. In the same manner, such positional changes are so made that the P-picture 13P precedes the B-pictures 11B and 12B.

In the MPEG system, audio data are also compressed in addition to motion picture data compressed by predictive coding as described above. And both the motion picture data and the audio data thus compressed are recorded, on a medium such as a disk, in a form of time-division multiplexed bit stream data for example. FIGS. 4A to 4C show an exemplary format of such multiplexed data.

As shown in FIG. 4A, one unit of multiplexed bit stream in the multiplexed data recorded on a disk through time-division multiplexing consists of at least one pack (PACK) and ISO_11172_end_code. This ISO_11172_end_code is composed of 32 bits and is prescribed as "0x000001b9" in hexadecimal notation. The top "0x" signifies that this code is hexadecimal (C language).

As shown in FIG. 4B, the Pack consists of a header composed of Pack_Start_Code, PCR (Program Clock Reference) and MUX_Rate, and at least one packet (Packet). The Pack_Start_Code in the header is composed of 32 bits and is prescribed as "0x000001b4" in hexadecimal notation.

Although the length of each pack is defined to be variable, it may be fixed to a length of 2048 bytes for example. Therefore, the following explanation will be given on an assumption that the pack has a fixed length of 2048 bytes.

Each of packets constituting one pack consists of, as shown in FIG. 4C, a header including Packet_Start_Code_Prefix, Stream_ID, Packet_length, PTS (Presentation Time Stamp) and DTS (Decoding Time Stamp), and packet data (Code Data).

This Packet_Start_Code_Prefix is composed of 24 bits and is prescribed as "0x000001" in hexadecimal rotation. The Stream_ID is a code composed of 8 bits and represents a packet type (Stream Type) to signify whether the packet data is an audio stream or a video stream. And the Packet_length (composed of 16 bits) signifies the length of a subsequent packet.

In the packet data (Code Data) of each packet, audio data are recorded in the case of an audio stream, or video data are recorded in the case of a video stream. Since an audio stream and a video stream are enabled to have 32 kinds and 16 kinds, respectively, of different stream_ID, it is possible to multiplex a plurality of audio and video signals up to a maximum of such numbers.

In case a plurality of frame data including, e.g., I-, P- and B-pictures are recorded as packet data (Code Data), a frame start code is attached per unit of the recorded frame data.

FIG. 5 schematically shows an exemplary circuit configuration of a decoding apparatus designed to decode the data coded according to the MPEG system mentioned above.

For example, motion picture and audio data coded through time-division multiplexing according to the MPEG system and read out from a disk or the like are supplied as a bit stream signal BST to a demultiplexer 1. Subsequently in the demultiplexer 1, the input bit stream signal BST is separated into video stream data VDST and audio stream data ADST, which are then outputted respectively to a video decoder 2 and an audio decoder 3. Further in the demultiplexer 1, the pack header and the packet header explained with reference to FIG. 4 are separated from the input bit stream signal BST, and PTS (Presentation Time stamp) is extracted from the packet header for example and then is supplied to a host processor 5 so as to be used for attaining synchronism of picture and sound under control, as will be described later.

In this case, the host processor 5 serves to control the decoding apparatus shown in FIG. 5. Meanwhile, in controlling the video decoder 2 and the audio decoder 3, various control signals are transmitted thereto via internal host interfaces 2a and 3a, respectively.

The video decoder 2 decodes the video stream data VDST while utilizing a code buffer area 4a and a frame memory area 4b of a RAM 4, as will be described later.

The video stream data VDST inputted to the video decoder 2 are once stored in an input buffer 11 of a relatively small capacity and then are supplied to and stored in a code buffer area 4a of a RAM 4 having a relatively great capacity. The video stream data VDST thus stored in the RAM 4 are read out therefrom at a timing coincident with the decoding process of a decode block 13 in the video decoder 2, and then are inputted to an analyzer 12.

In the analyzer 12, a required analysis is executed with regard to the input video stream data VDST, and merely the data needed for the decoding process in the following decode block 13 are extracted and outputted. In the decode block 13, the data supplied from the analyzer 12 are decoded in a predetermined manner.

In this stage of the operation, the process executed in the decode block 13 includes a step of sequentially decoding the I-, P- and B-pictures inputted as predictive coded data. The video data obtained by decoding the input coded data at this step are frame data corresponding to the picture arrangement order shown in FIG. 3B. And the data thus decoded are supplied to the frame memory area 4b of the RAM 4.

The frame memory area 4b is sufficient for retaining frame data of a predetermined number of pictures of I-, P and B types. And in reading out the stored data, the frame data are supplied to the video decoder 2 again while being sequentially selected in the order of reproduction, and a predetermined process is executed when necessary, whereby a video decode output VDO corresponding to the frame order of the original pictures shown in FIG. 3A is finally outputted from the video decoder 2.

Meanwhile the audio stream data ADST outputted from the demultiplexer 1 are supplied to the audio decoder 3, which then executes a required decoding process and delivers an audio decode output ADO therefrom.

Thus, the predetermined decoding process is executed in the decoding apparatus of FIG. 5 in the manner mentioned above.

In the decoding apparatus of FIG. 5, as obvious from the description given hereinabove, bit stream signals of video and audio data recorded through time-division multiplexing are separated into the video data and the audio data, which are then decoded individually.

Accordingly, for the purpose of outputting the reproduced picture and the reproduced sound synchronously with each other, it is practically necessary to control the synchronism of the video decode output VDO obtained from the video decoder 2 and the audio decode output ADO obtained from the audio decoder 3.

The synchronism control is executed in such a manner that the PCR (FIG. 4B) inserted as a reference clock index in the header of the pack extracted from the bit stream signal BST is compared with the PTS inserted as a frame time index in the packet, and when a coincidence is attained therebetween, the series of frame data corresponding to the PTS start to be decoded so that finally the sound and the picture are synchronized with each other.

For such synchronism control, the decoding apparatus employed practically needs to be so constituted as to detect the timing to start its decoding operation after the frame data indicated by the PTS loaded in the host processor 5 are once stored in the input buffer 11 and the code buffer area 4a and then are read out again by the video decoder 2, i.e., the timing for the analyzer 12 to start analyzing the frame data.

As a timing detection method for recognizing the correspondence between the frame data and the PTS, there is known an example wherein the PTS separated once from the bit stream signal BST in the demultiplexer 1 is inserted again into the header of the frame of the video stream data VDST and then is supplied to the video decoder 2.

As for the position of inserting the PTS in this case, it is inserted, on the basis of a specific format, in a predetermined user_data area prescribed by the MPEG system in the video stream data VDST, or at a predetermined position based on a particularly prescribed format.

And in the decoding operation of the video decoder 2, the PTS data is detected and extracted by the analyzer 12 from the video stream data VDST where the PTS is inserted. Upon detection of the PTS, a detection signal is outputted as an interrupt to the host processor 5. And in response to the PTS detection signal, the host processor 5 is capable of taking correspondence between the PTS inserted in the frame data to be processed by the analyzer 12 and the PCR loaded already in the host processor 5, whereby the operations of the video decoder 2 and the audio decoder 3 are rendered controllable in a manner to synchronize the video data output VDO and the audio data output ADO with each other.

According to another known method, write and read addresses in the code buffer area 4a of the RAM 4 are managed by pointers.

More specifically, at the time the PTS data is separated from the bit stream signal BST for example in the demultiplexer 1 and is supplied to the video decoder 2, the frame data with the PTS attached thereto is identified in the host processor 5, and when this frame data is written in the code buffer area 4a of the RAM 4, the relevant address is written in a pointer register set separately.

A read pointer for the code buffer 4a is incremented in accordance with progress of the decoding process in the decoder block 13, and upon arrival of the pointer at the value corresponding to the frame data, a detection signal is outputted as an interrupt to the host processor 5 so that the process of decoding the frame data is started in a function circuit posterior to the analyzer 12. Consequently, it becomes possible in the host processor 5 to execute such control as to synchronize the video data output VDO and the audio data output ADO with each other.

However, in the former of the two related art timing detection methods mentioned above, the PTS once separated in the demultiplexer 1 is inserted in the header of the video stream data VDST, whereby the format of the video stream data VDST needs to be modified. For this reason, there exists no conformability to any video stream data VDST where a PTS is inserted on the basis of a different format. It follows that the decoding apparatus has a problem of lacking in interchangeability and general-purpose usability.

Meanwhile in the latter method where write and read addresses in the code buffer area 4a of the RAM 4 are managed, the format of the video stream data VDST need not be modified to consequently ensure adequate general-purpose usability, but an address counter employed for management of addresses in the code buffer area 4a is required to have a considerably great capacity with many bits, hence causing some disadvantages in view of the production cost.

SUMMARY OF THE INVENTION

It is therefore an object of the present invention to provide improvements in a timing detection device and method for detecting, in video and audio synchronism control, a timing to process frame data which correspond to reproduction output time management information, wherein proper interchangeability is achievable and still the cost is reducible.

According to an aspect of the present invention, there is provided a timing detection device comprising: a counter for counting the number of frames of coded picture data stored in a storage area predetermined for storing coded picture data; a register where the count value of the counter is loaded at the timing when reproduction output time management information has been extracted from the frame of the coded picture data written in the storage area, and the loaded count value is decremented upon completion of each analysis performed per frame with regard to the coded picture data read out from the storage area; and a detection circuit for outputting, in response to resetting of the count value of the register to its initial value, a timing detection signal signifying readout of the coded picture data of the frame from which the reproduction output time management information has been extracted.

According to another aspect of the present invention, there is provided a timing detection method comprising the steps of: counting the number of frames of coded picture data stored in a storage area predetermined for storing coded picture data; loading and retaining the count value indicative of the number of frames stored in the storage area, at the timing when reproduction output time management information has been extracted from the frame of the coded picture data written in the storage area; decrementing the loaded count value upon completion of each analysis performed per frame with regard to the coded picture data read out from the storage area; and outputting, in response to resetting of the loaded count value to its initial value, a timing detection signal signifying readout of the coded picture data of the frame from which the reproduction output time management information has been extracted.

In the above constitution, there are achievable advantageous effects that, when the loaded count value indicative of the number of frames of the coded picture data stored in the storage area is reset to its initial value, the frame data to be decoded next can be identified as the frame data corresponding to the reproduction output time management information extracted previously, whereby it is rendered possible, in a reproduction mode, to execute video and audio synchronism control for synchronizing the picture and the sound with each other on the basis of such information of identification.

The above and other features and advantages of the present invention will become apparent from the following description which will be given with reference to the illustrative accompanying drawings.

BRIEF DESCRIPTION OF THE DRAWINGS

FIG. 1 is a block diagram schematically showing a circuit configuration of a decoding apparatus which includes a timing detection device representing an embodiment of the present invention;

FIG. 2 is a block diagram showing a construction of a frame counter employed in the embodiment;

DESCRIPTION OF THE PREFERRED EMBODIMENTS

Figure 5:
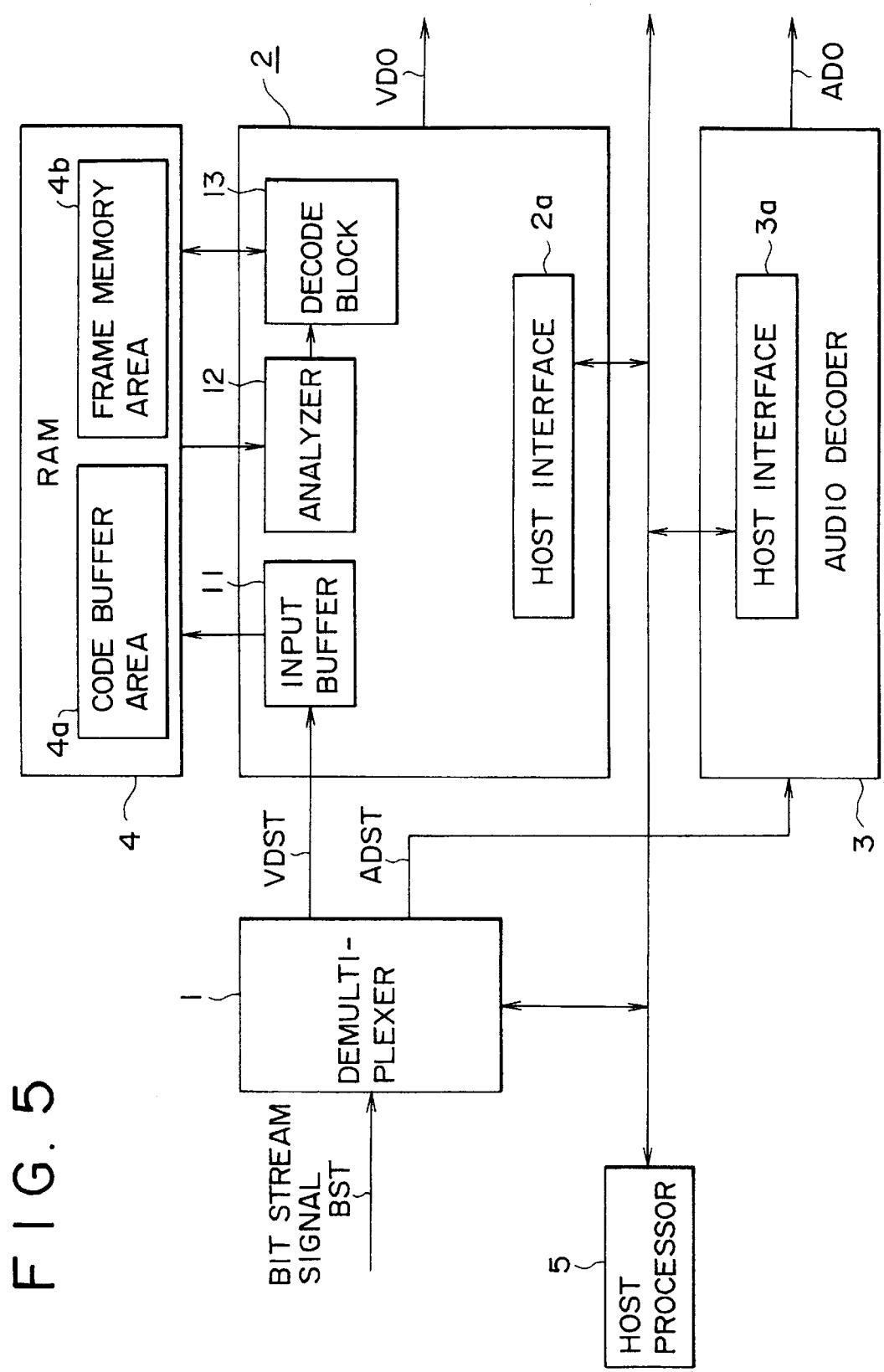
FIG. 5 is a block diagram schematically showing a circuit configuration of a related art decoding apparatus which includes a known timing detection device in the related art.

FIG. 1 is a block diagram schematically showing an exemplary configuration of a decoding apparatus which includes a timing detection device representing a preferred embodiment of the present invention. In this decoding apparatus, video and audio synchronism control is executed to synchronize picture and sound with each other, as will be described later. In this case, the decoding apparatus is supposed to be a type capable of decoding video signal data coded by the MPEG system. In this diagram, any component blocks corresponding to those shown in the aforementioned example of FIG. 5 are denoted by like reference numerals. Although the decoding apparatus shown in FIG. 1 is applicable to a variety of media inclusive of recording media such as DVD, communication media and broadcasting media, the following description will be given on an exemplary one for decoding the coded picture data read out from a DVD.

Figures 4A, 4B, 4C:
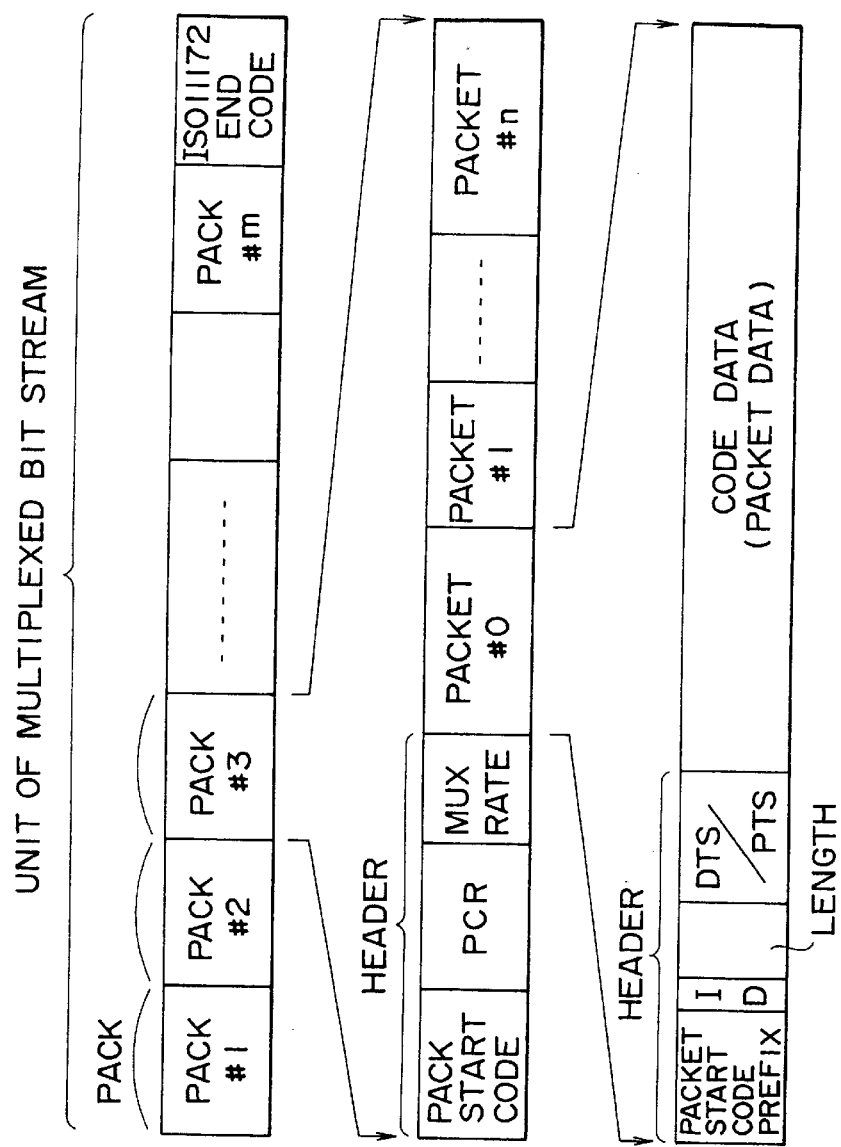
FIGS. 4A to 4C show a data format in one unit of a time-division multiplexed bit stream.

In the decoding apparatus of FIG. 1, the MPEG coded data read out from a DVD for example is inputted as a bit stream signal BST to a demultiplexer 1. In the bit stream signal BST, video data and audio data coded by the MPEG system are time-division multiplexed in the format explained with reference to FIG. 4.

In the demultiplexer 1, a pack header (FIG. 4B) and a packet header (FIG. 4C) are separated from the input bit stream signal BST.

Subsequently, referring to Stream_ID inserted in the packet header, identification is executed as to whether the packet data is an audio stream or a video stream, and the identified stream is separated. The video stream is outputted as video stream data VDST to a video decoder 2, while the audio stream is outputted as audio stream data ADST to an audio decoder 3.

A PTS (Presentation Time Stamp) included as information for managing the reproduction output time is extracted from the packet header and then is supplied to a host processor 5 so as to be used for video and audio synchronism control. This PTS is inserted in each or a plurality of frame data within a predetermined range to indicate the reproduction output time of the frame data corresponding to the PTS.

The host processor 5 serves to perform overall general control of the decoding apparatus in this embodiment. And in controlling the video decoder 2 and the audio decoder 3, various control signals are transmitted thereto via internal host interfaces 2a and 3a, respectively.

The video decoder 2 employed in this embodiment consists of an input buffer 11, an analyzer 12, a decode block 13, a frame counter 14 and a host interface 2a, as shown in FIG. 1.

A RAM 4 has a code buffer area 4a and a frame memory area 4b, and these memory areas are used in a decoding process executed in the video decoder 2, as will be explained below.

In this embodiment, the fundamental operation of decoding the video data in the video decoder 2 is performed in the following manner.

The video stream data VDST inputted from the demultiplexer 1 to the video decoder 2 is supplied first to the input buffer 11 to be once stored therein. In comparison with the undermentioned RAM 4 of a large capacity, this input buffer 11 has a relatively small capacity.

The output video stream data VDST from the demultiplexer 1 is branched and supplied also to the frame counter 14. This operation will be described later in detail.

The video stream data VDST stored in the input buffer 11 is supplied to the RAM 4 and then is stored in the code buffer area 4a in the RAM 4. The video stream data VDST thus stored in the RAM 4 is read out therefrom at a timing coincident with the decoding process executed in the decode block 13 of the video decoder 2 and then is inputted to the analyzer 12 of the video decoder 2.

As for the operation of the analyzer 12 in this embodiment, a predetermined analysis is executed with regard to the input video stream data VDST to thereby extract the data required for the decoding process in the succeeding-stage decode block 13, and the extracted data is outputted to the decode block 13. Further the analyzer 12 outputs a decrement signal $S_2$ to the frame counter 14 upon completion of the process for each frame of the input video stream data VDST. The operation of the frame counter 14 performed in response to the decrement signal $S_2$ will be described later.

In the decode block 13, a predetermined decoding process is executed with regard to the data supplied from the analyzer 12.

The decode block 13 decodes, e.g., the input video stream data VDST received from the analyzer 12 to thereby obtain frame data of I-, P- and B-picture types decoded successively. In this stage of the operation, there are obtained the frame data corresponding to the arrangement order of the pictures shown in FIG. 3B.

Figure 3A:
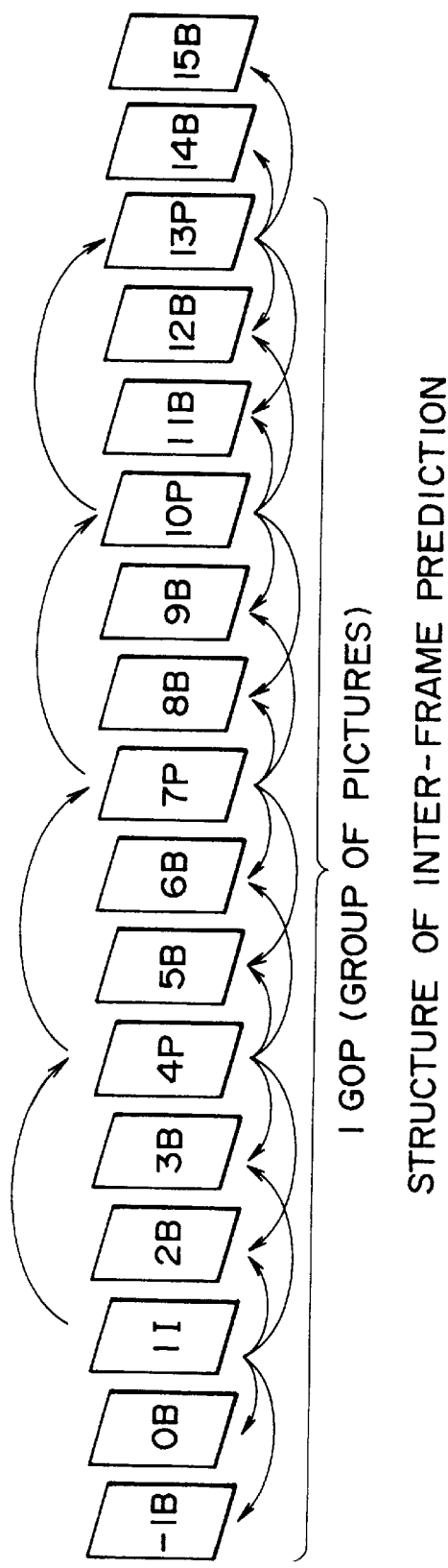
FIGS. 3A and 3B show a structure of inter-frame prediction and a structure of media frames, respectively.
Figure 3B:
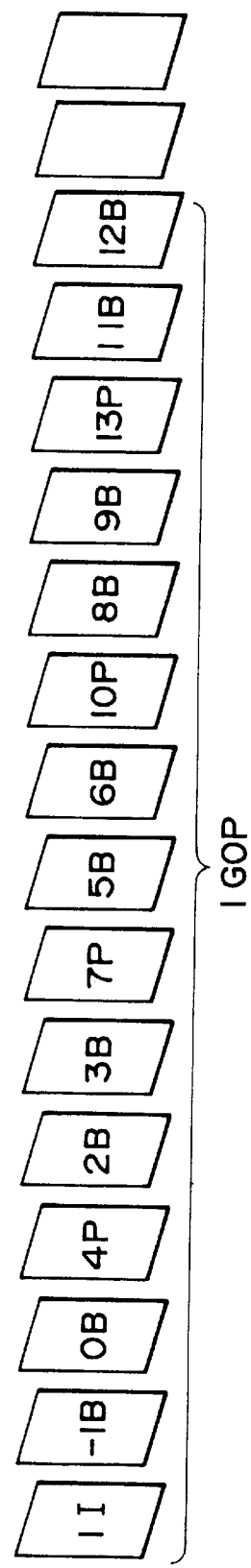

And the frame data thus obtained are once supplied from the decode block 13 to the frame memory area 4b of the RAM 4 to be written and stored therein, so as to be rearranged in the frame order corresponding to the original picture signals shown in FIG. 3A.

The frame memory area 4b of the RAM 4 is so set as to be capable of retaining data of a predetermined number of frames. And the frame memory area 4b is controlled in such a manner that the frame data stored therein are read out in the frame order of FIG. 3A. The frame data thus read out successively from the frame memory area 4b are supplied again to the video decoder 2 for example. And when necessary, a predetermined process is further executed so that finally a video code output VDO corresponding to the frame order of the original pictures shown in FIG. 3A is outputted from the video decoder 2.

Meanwhile in the audio decoder 3, a required decoding process is executed with regard to the input audio stream data ADST received from the demultiplexer 1, and an audio decode output ADO is delivered therefrom.

Hereinafter an explanation will be given on the video and audio synchronism control performed in this embodiment. For this purpose, as mentioned, it is necessary to recognize the timing when the analyzer 12 is enabled to start processing the PTS retained in the host processor 5 and the frame data corresponding to the PTS. In this embodiment, the video decoder 2 is equipped with a frame counter 14 to execute such recognition of the timing.

FIG. 2 is a block diagram showing the internal configuration of the frame counter 14, which includes a frame start code detector 21, a counter 22, a register 23 and a "0" detector 24. Although unshown in this diagram, the frame counter 14 is connected to the host interface 2a of FIG. 1 via a control line L so that a detection signal $S_3$ and a load command signal $S_4$ can be inputted or outputted as will be described later, and also that the counter 22 is resettable to its initial state by the host processor 5 and the count value of the counter 22 can be read out.

The operation of the frame counter 14 is performed in the following manner.

For example, in the initial reset state of the video decoder 2, the counter 22 in the frame counter 14 is also in a reset state.

The video stream data VDST supplied from the demultiplexer 1 to the input buffer 11 as described in connection with FIG. 1 is branched and inputted to the frame counter 14. This video stream data VDST is first inputted to the frame start code detector 21.

The frame start code detector 21 detects a frame start code from the video stream data VDST inputted thereto. A frame start code is inserted in the header of every frame data and indicates a start of unitary frame data in the video stream data VDST. And subsequently the frame start code detector 21 outputs an increment signal $S_1$ to the counter 22 upon detection of each frame start code.

In response to the increment signal $S_1$, the counter 22 increments its count value. More specifically, the counter 22 executes a count-up action upon reception of every frame data in the video stream data VDST inputted to the video decoder 2.

When the decoding process is thus started in the reset state of the video decoder 2, the video stream data VDST inputted to the video decoder 2 is supplied again to the analyzer 12 of the video decoder via the input buffer 11 and the code buffer 4a of the RAM 4, and then a required analysis is executed.

And a decrement signal $S_2$ is outputted, in this embodiment, upon completion of the analysis of each frame by the analyzer 12 as mentioned. Then the counter 22 decrements its count value in response to the decrement signal $S_2$ inputted thereto.

Consequently, the count value indicated by the counter 22 always signifies the number of frames in the video stream data VDST stored in the code buffer area 4a of the RAM 4.

Thereafter, as described with reference to FIG. 1, the demultiplexer 1 extracts the PTS from the bit stream signal and transfers the PTS to the host processor 5. Then, in accordance with the timing when the frame data corresponding to the PTS is inputted as video stream data VDST to the video decoder 2, the host processor 5 applies a load command signal $S_4$ from, e.g., the host interface 2a via a control line L to the register 23, whereby the count value of the counter 22 at this time is loaded and retained in the register 23.

Since the line for the decrement signal $S_2$ outputted from the analyzer 12 is connected to the register 23, the value retained in the register 23 is decremented one by one upon completion of the process for each frame in the analyzer 12.

Therefore, the value indicated by the register 23 corresponds to the number of frame data left to be processed in the analyzer 12 by the time when the frame data, which corresponds to the PTS separated previously in the demultiplexer 1 and retained in the host processor 5, is started to be processed in the analyzer 12.

The output of the register 23 is supplied to the "0" detector 24. When the "0" detector 24 has detected that the value in the register 23 has become "0" (zero), i.e., when the state of the video decoder 2 is such that the data to be processed next in the analyzer 12 is identified as the frame data corresponding to the PTS, the "0" detector 24 transmits a detection signal $S_3$ via the host interface 2a to the host processor 5, whereby an interrupt is executed.

In response to the detection signal $S_3$, the host processor 5 first compares the PTS corresponding to the frame data with the PCR affixed as a reference time index to the pack header, and then controls the timing to execute a decoding process in a manner to synchronize the video decode output VDO and the audio decode output ADO with each other.

More concretely, the timing of synchronization with the audio decoder 3 is controlled by once halting the frame data processing in the analyzer 12 and the decode block 13 of the video decoder 2, or by skipping the frame data and then executing the process of decoding the subsequent frame data.

In this manner, the embodiment is equipped with the frame counter 14 in the video decoder 2 so that, on the basis of the frame counting action of the frame counter 14, it becomes possible to detect the timing to start processing the frame data corresponding to the PTS extracted in the demultiplexer 1, whereby the host processor 5 is rendered capable of executing synchronism control in accordance with the detection information (detection signal $S_3$).

The operation of the frame counter 14 described above is concerned with the processing range from the initial reset state of the video decoder 2 to execution of synchronism control. However, according to the construction of the frame counter 14 employed in this embodiment, the frame corresponding to the PTS can be identified at any point of time during the operation of the video decoder 2. Further in any of special reproduction modes including a fast-forward mode, since the number of frames inputted to the video decoder 2 is counted, it is still possible to recognize the correspondence between the PTS and the frame data started to be processed in the analyzer 12.

The constitution of the decoding apparatus equipped with a synchronism controller and so forth, to which the present invention is applicable, is not limited to the exemplary constitution of the decoding apparatus or the frame counter shown in FIGS. 1 and 2, and various changes may be made within the scope of the present inventive concept.

As described hereinabove, according to the present invention where a frame counter is employed in the video decoder for example to detect the timing to start decoding the frame data corresponding to the PTS, video stream data inputted to the video decoder need not be modified at all differently from the related art, hence achieving advantageous effect of general-purpose usability.

Furthermore, the number of bits in the counter or that in the register used for detection of the timing may be set in conformity with the number of frames storable in the code buffer area for example to consequently eliminate the necessity of any great number of bits, whereby the circuit scale is not enlarged in particular and the production cost is reducible.

Although the present invention has been mentioned above with reference to some preferred embodiments thereof, it is to be understood that the invention is not restricted to such embodiments alone, and a variety of other modifications and variations will be apparent to those skilled in the art without departing from the spirit of the invention.

The scope of the invention, therefore, is to be determined solely by the appended claims.

What is claimed is:

1. A timing detection device comprising:

a counter means for counting the number of frames of coded picture data stored in a storage area predetermined for storing coded picture data;

a register means where the count value of said counter means is loaded at a timing when reproduction output time management information has been extracted from the frame of the coded picture data written in said storage area, and the loaded count value is decremented upon completion of each analysis performed per frame with regard to the coded picture data read out from said storage area; and a detection means for outputting, in response to resetting of the count value of said register means to its initial value, a timing detection signal signifying readout of the coded picture data of the frame from which the reproduction output time management information has been extracted.

2. A timing detection device according to claim 1, further having a first detection means which outputs a detection signal upon every detection of a frame start code affixed to each of the frames in said coded picture data, wherein said counter means increments its count value in response to every input of said detection signal.

3. A timing detection device according to claim 2, wherein said coded picture data are those based on the MPEG system, and said reproduction output time management information is a presentation time stamp (PTS).

4. A timing detection method comprising the steps of:

counting the number of frames of coded picture data stored in a storage area predetermined for storing coded picture data;

loading and retaining the count value indicative of the number of frames stored in said storage area, at the timing when reproduction output time management information has been extracted from the frame of the coded picture data written in said storage area;

decrementing the loaded count value upon completion of each analysis performed per frame with regard to the coded picture data read out from said storage area; and outputting, in response to resetting of the loaded count value to its initial value, a timing detection signal signifying readout of the coded picture data of the frame from which the reproduction output time management information has been extracted.

5. A timing detection method according to claim 4, wherein a detection signal is outputted upon every detection of a frame start code affixed to each of the frames in said coded picture data, and the output detection signals are counted.

6. A timing detection method according to claim 4, wherein said coded picture data are those based on the MPEG system, and said reproduction output time management information is a presentation time stamp (PTS).

* * * * *